United States Patent [19]

Doetsch et al.

[11] Patent Number: 5,399,328
[45] Date of Patent: Mar. 21, 1995

[54] PROCESS FOR PREPARING PEROXYBORATE AGGLOMERATES

[75] Inventors: Werner Doetsch, Bad Hoenningen; Richard Roesler, Rheinbrohl; Werner Zeiss, Groebenzell; Rudolf Siegel, Neuwied, all of Germany

[73] Assignee: Peroxid-Chemie GmbH, Hoellriegelskreuth, Germany

[21] Appl. No.: 651,644

[22] Filed: Feb. 6, 1991

[30] Foreign Application Priority Data

Feb. 10, 1990 [DE] Germany ............... 40 04 082.8
Jun. 6, 1990 [DE] Germany ............... 40 18 037.9

[51] Int. Cl.$^6$ .............. C01B 15/12; C22B 1/14
[52] U.S. Cl. .............. 423/279; 23/313 R; 264/118; 423/281
[58] Field of Search .......... 423/279, 281, 313 R; 264/118

[56] References Cited

U.S. PATENT DOCUMENTS

| | | | |
|---|---|---|---|
| 338,924 | 3/1886 | Carson et al. | 264/109 |
| 1,076,039 | 10/1913 | Jacobs | 423/281 |
| 2,491,769 | 12/1949 | Rolando | 95/13 |
| 2,863,835 | 12/1958 | Goldsmith | 423/281 |
| 3,914,380 | 10/1975 | Dillenburg et al. | 423/279 |
| 4,115,519 | 9/1978 | Brichard et al. | 423/279 |
| 4,185,960 | 1/1980 | Brichard et al. | 8/111 |
| 4,320,105 | 3/1982 | Nelli et al. | 423/421 |
| 4,681,748 | 7/1987 | Doetsch et al. | 423/279 |
| 4,968,500 | 11/1990 | Bertsch-Frank et al. | 423/281 |
| 5,108,726 | 4/1992 | Baldwin et al. | 423/279 |

FOREIGN PATENT DOCUMENTS

| | | |
|---|---|---|
| 0328768 | 12/1988 | European Pat. Off. |
| 534282 | 12/1931 | Germany |
| 901287 | 1/1954 | Germany |
| 1112502 | 8/1961 | Germany |
| 1164989 | 3/1964 | Germany |
| 1195278 | 6/1965 | Germany |
| 3804509 | 8/1989 | Germany |
| 1520127 | 8/1978 | United Kingdom |

OTHER PUBLICATIONS

Heller, Gmelin, Handbook of Inorganic Chemistry, Supplement to the 8th edition, vol. 28, "Boron Compounds", Springer Publishing, New York, 1975, pp. 49,55,57.

*Primary Examiner*—Wayne A. Langel
*Attorney, Agent, or Firm*—Evenson, McKeown, Edwards & Lenahan

[57] ABSTRACT

A process is described for preparing peroxyborate agglomerates having an active oxygen content of at least 14% by weight in which amorphous primary particles composed of peroxyborate prepared by a spray drying process are subjected to compacting pressing-agglomeration. Briquettes, compressed strips and tablets can be obtained which can be comminuted, if desired, to peroxyborate granules of desired particle size and bulk density. Advantageous, optionally colored, peroxyborate agglomerates, particularly peroxyborate granules are prepared. Preferred agglomerates and granules are composed of sodium peroxyborates.

13 Claims, No Drawings

PROCESS FOR PREPARING PEROXYBORATE AGGLOMERATES

BACKGROUND OF THE INVENTION

This invention relates to a process for preparing peroxyborate agglomerates having an active oxygen content of at least 14% by weight, in which amorphous primary particles composed of peroxyborate prepared by a spray drying process are subjected to a compacting pressing-agglomeration; to the peroxyborate agglomerates prepared by this process, and to granular material which can be obtained therefrom.

As used herein, the term "peroxyborates" refers to boron oxygen compounds essentially free from water of crystallization and containing peroxy groups, which have a ratio of equivalents of metal cations (which serve to compensate for negative charges in the compound) to equivalents of boron atoms of $\leq 1$ and a molar ratio of active oxygen atoms ($O_2$; Avox) to metal atoms of $\geq 1$. The metal cations can be alkali metal cations and/or alkaline earth metal cations. The alkali metal cations, particularly the sodium cation are, however, preferred so that the compounds are then sodium peroxyborates for example. The term sodium peroxyborate includes both conventional sodium perborate monohydrate ($Na:B=1$; $O_2:Na=1$) and superoxidized sodium perborates having a high active oxygen content ($O_2:Na \geq 1$) and perborates with a molar ratio of $Na:B$ ($\leq 1$, which differs from the conventional $Na:B$ ratio ($=1:1$), for example perborax in which $Na:B=0.5$.

Sodium peroxyborates are obtained as solids from aqueous reaction solutions/suspensions by reacting boron-oxygen compounds, after adjusting to the $Na:B$ molar ratio desired in the product, with hydrogen peroxide according to various processes, e.g. by crystallization and optional subsequent drying in order to remove water of crystallization or by direct drying of the reaction solutions/suspensions by vacuum drying, roller drying or spray drying processes. They are used either directly or after further treatment, e.g. agglomerative granulation, for bleaching, disinfecting and as washing agents.

A number of processes for preparing sodium peroxyborates are already known in the art. U.S. Pat. No. 3,914,380 and British Patent No. GB 1,520,127 describe the preparation of attrition-resistant sodium perborate monohydrate (PBS-1) from sodium perborate tetrahydrate (PBS4) obtained by crystallization in a fluid bed dryer, while a relative humidity of 40 to 80%, preferably 50–70%, is maintained in the air surrounding the crystal granules, and while the temperature of the exhaust air is adjusted to at least 60° C. such that partial melting of the perborate is achieved.

German Published Application No. DE 38 04 509 describes a two-stage preparation of sodium perborates, preferably sodium perborate monohydrate. In a first process stage, a very fine perborate monohydrate is initially obtained by spray drying aqueous sodium-, boron- and active oxygen-containing reaction mixtures of the kind also used for preparing sodium perborate tetrahydrate by crystallization. This monohydrate, however, still has unsatisfactory storage stability. This disadvantage is overcome in the above-mentioned patent application by subjecting the very fine primary particles obtained by spray drying to agglomerative granulation in the presence of water in a second process stage immediately after they leave the spray drying zone. The amorphous primary particles are converted to granules of perborate with an at least partially crystalline structure. Spray dryers with an integrated fluidized bed (fluid bed spray dryer FSD) or spray dryers in combination with cylindrical intensive mixers with a fluidized bed device are proposed for carrying out the process.

A fluid bed spray granulation process for preparing attrition-resistant sodium perborate monohydrate granules is proposed in U.S. Pat. No. 4,115,519. To this end, an aqueous solution containing 5 to 75% by weight hydrogen peroxide and an aqueous solution containing 5 to 40% by weight sodium metaborate are sprayed in a fluid bed dryer at a temperature ranging from ambient temperature to 100° C. onto nuclei with smaller dimensions than those of the granular particles to be prepared, and the water present in the aqueous solutions is evaporated by the fluidizing gas introduced into the fluid bed dryer.

The preparation of solid, superoxidized sodium perborate containing more than 16% by weight active oxygen and less than 1.4 atoms of hydrogen per active oxygen atom is described in U.S. Pat. No. 4,185,960. To this end, an at least 30% by weight hydrogen peroxide solution and an aqueous sodium metaborate solution are sprayed simultaneously into a fluid bed dryer. The fluid bed dryer contains nuclei whose dimensions are smaller than those of the perborate particles to be prepared, and the hydrogen peroxide and sodium metaborate are introduced into the fluid bed in a molar ratio which is greater than 1.12 (fluid bed spray granulation process FSG).

In a process according to U.S. Pat. No. 4,681,748, superoxidized sodium perborates are prepared by drying a solution or suspension of sodium metaborate and hydrogen peroxide with a borate concentration (calculated as $B_2O_3$) of 90 to 130 g/l and a molar ratio of $H_2O_2$ to $B_2O_3$ of 2.0:1 to 4.2:1 in a spray dryer at an exhaust air temperature of 55° to 120° C. (preferably 60° to 95° C.) and recovering the resulting spray-dried material.

U.S. Pat. No. 2,491,769 describes the preparation of sodium peroxyborates with $Na:B$ molar ratios of 0.53 to 0.97, preferably 0.8 to 0.95. To this end, aqueous mixtures containing boron-oxygen and sodium compounds are reacted with hydrogen peroxide while maintaining the given $Na:B$ ratios, and the solid sodium peroxyborates are subsequently recovered by rapid drying of the reaction mixture. Roller dryers are used for drying, but the possibility of vacuum drying or spray drying is also mentioned.

German Patent No. DE 901,287 also describes sodium perborates with $Na:B$ molar ratios of less than 1, particularly less than 0.7. The products are obtained by adding boric acid and hydrogen peroxide to a sodium borate in ratios such that the end product contains active oxygen according to a molar ratio of $H_2O_2:Na$ of 0.5:1 to 4.1:1 and such that the molar ratio of $Na:B$ in the end product is less than 0.5:1. The resulting slurry or solution is dried by evaporation. Drying is preferably carried out under reduced pressure and at a somewhat elevated temperature. The purpose of the described process is to prepare sodium peroxyborate products that can be mixed in the dry state with boric acid to yield dry powders so that products are obtained which have an acid or essentially neutral reaction and, in addition, have a buffering effect.

German Published Application No. DE 1 112 502 describes a process for preparing perborax (Na:B=0.5) by spray drying a reaction mixture containing borax and hydrogen peroxide. Products with active oxygen contents of 15 to 18% by weight can be obtained, but a perborax with an active oxygen content of 9 to 12% by weight is preferentially prepared. In order to increase the rate of dissolution of the perborax which is obtained, it is moreover desirable to incorporate an even fine distribution of 5 to 15% by weight salts which solidify in crystalline form in the reaction mixture before spray drying.

The processes of the prior art have a number of disadvantages. They include, for example, a relatively large number of separate process stages. For example, during the preparation of PBS-1 from PBS-4, the perborate tetrahydrate must initially be obtained by crystallization and subsequently passed to a drying stage in order to remove the water of crystallization. The perborate products obtained by spray drying are usually very fine particles and therefore cannot be used immediately. Although these very fine particles can be converted to larger particles according to the state of the art by agglomerative granulation in the presence of water, active oxygen losses can occur during this process. Such an after-treatment requires the presence of granulating aids, e.g. binders and solvents, such as water, as a result of which an additional subsequent drying stage is required. Moreover, in all the sodium peroxyborates of the prior art, the solubility, the rate of dissolution, and the resistance of the particles to caking are unsatisfactory or require further improvement. There remained, therefore, a need for a simple, direct process for preparing peroxyborate agglomerates, particularly sodium peroxyborate granules, having a high active oxygen content, having particle sizes and bulk densities convenient for use, and having good solubility and a high rate of dissolution.

SUMMARY OF THE INVENTION

It is the object of the invention to provide a process for producing peroxyborate agglomerates which overcomes the disadvantages of the prior art.

It is also an object of the invention to provide a process for preparing peroxyborate agglomerates which is technically simple to carry out.

Another object of the invention is to provide a process for preparing peroxyborate agglomerates is particularly suitable for preparing sodium peroxyborate agglomerates.

A further object of the invention is to provide a process for preparing peroxyborate agglomerates directly by spray drying.

Yet another object of the invention is to provide a process for preparing peroxyborate agglomerates which makes it possible to convert the primary particles in an efficient manner to peroxyborate agglomerates.

A still further object of the invention is to provide peroxyborate agglomerates and granules having a high active oxygen content and improved properties.

These and other objects of the invention are achieved by providing a process for preparing a peroxyborate agglomerate comprising the step of compacting amorphous, spray dried primary peroxyborate particles by pressing-agglomeration, said particles having an active oxygen content of at least 14% by weight.

According to a preferred aspect, the invention further comprises subjecting the spray dried primary particles to agglomerative granulation prior to said pressing-agglomeration compacting step.

In accordance with a further preferred aspect, the invention further comprises comminuting the peroxyborate agglomerate obtained in the pressing-agglomeration compacting step to produce smaller agglomerate particles in the form of granular material having a desired particle size.

The invention also includes peroxyborate agglomerates having an active oxygen content of at least 14% by weight produced by compacting amorphous, spray dried primary peroxyborate particles by pressing-agglomeration.

DETAILED DESCRIPTION OF PREFERRED EMBODIMENTS

The invention relates to a process for preparing peroxyborate agglomerates with an active oxygen content of at least 14% by weight, in which amorphous primary particles composed of peroxyborate prepared by a spray drying process are compacted by pressing-agglomeration, optionally after an agglomerative granulation process subsequent to spray drying, and the resulting peroxyborate agglomerate is optionally comminuted to an agglomerate with smaller particles in the form of a granular material with the desired particle size. The peroxyborate agglomerates which are prepared according to the process of the invention can be alkali metal and/or alkaline earth metal peroxyborate agglomerates. Alkali metal peroxy- borate agglomerates are preferably prepared, particularly sodium peroxyborate agglomerates. Accordingly, the invention is described in further detail below with reference to examples of sodium peroxyborate agglomerates. It should be pointed out, however, that the process of the invention also yields products with improved properties from other alkali metal and alkaline earth metal peroxyborates.

According to the process of the invention, substantially dry primary particles are subjected to a pressing process and compacted by the applied pressure. The desired agglomeration of the primary particles is thereby achieved. Because agglomeration is brought about by pressing or exerting a pressure, the compacting pressing process is also called pressing or pressure agglomeration or, when granular material is prepared, pressing or pressure granulation. The pressing-agglomeration process for preparing agglomerates or granular material is therefore distinguishable from so-called "build-up" agglomeration processes ("build-up" granulation processes) in which the adhesion between the particles is obtained without significant application of pressure exclusively by bonding with liquid (e.g. water) and/or binders.

Although it is well known to use agglomeration processes for improving product properties, the application of such processes to products containing active oxygen, for example sodium peroxyborates, is new. Prior art agglomerates are produced inter alia, e.g. in order to obtain products with a time-release effect. In contrast, it is surprising that pressing-agglomeration of amorphous primary particles composed of, for example, sodium peroxyborates does not, in spite of the compacting effect of this process, lead to products with a time-release effect, i.e. delayed release or dissolution of the product. On the contrary, by pressure-agglomerating the amorphous sodium peroxyborate primary particles, products are obtained with an increased, particularly even a many times higher, rate of dissolution in water or predominantly water-containing media in comparison with the primary particles.

The temperature range in which the pressing-agglomeration process of the invention can be carried out corresponds to the temperature range in which the active oxygen-containing compounds used exhibit good thermal stability, and in which the process can be carried out without safety problems. For example, in a preferred embodiment of the invention pressing-agglomeration of the sodium peroxyborate primary particles is carried out at temperatures between approximately 20° and 50° C. In this temperature range, the process can be carried out without adversely affecting the active oxygen content of the sodium peroxyborate primary particles to be pressed; i.e. active oxygen losses that adversely affect the product are not observed.

Although the magnitude of the pressure to be applied in order to obtain the advantages of the invention can be freely selected within wide limits and can therefore be adapted to special wishes and product requirements, the lower limit of the pressure is determined by two factors. First, the minimum pressure to be applied should be sufficient to confer a sufficient mechanical strength and bulk density on the agglomerate of primary particles. Second, the minimum pressure should be sufficient to obtain at the same time a sufficient increase in the rate of dissolution, which increases as the pressure increases. For some applications, only a moderate increase in the rate of dissolution, e.g. to 1.2 to 1.5 times the rate of dissolution of the primary particles, can be regarded as sufficient. As a rule, however, a greater increase in the rate of dissolution is desired, e.g. 2 to 3 times the rate of dissolution of the primary particles. The minimum pressing pressure to be applied in order to achieve the desired properties depends on the type of pressing machines used and can easily be determined by a person skilled in the art in a few preliminary tests with regard to the desired product properties. The upper limit of the pressure to be applied is not critical and is limited only by the maximum possible or permissible pressure of the equipment used for pressing-agglomeration. In an illustrative embodiment of the invention using a roller press, the amorphous primary sodium peroxyborate particles are compacted, for example, by pressing at pressures in the range from at least 0.2 tons to a maximum of approximately 2 tons per cm of roller length. Compaction is preferably carried out at pressures of at least 0.8 tons per cm of roller length.

In comparison with the heaps of fine primary particles, the agglomerates obtained according to the invention are formed products or they are agglomerate material (e.g. granular material) which is improved in terms of shape and appearance, and which has a reduced tendency to form dust, to adhere, to cake and to segregate, can be metered and transported better, and has better free-flowing properties and a defined bulk density. According to the process of the invention, product properties such as agglomerate or granule shape and size and the bulk density of the peroxyborates can be adapted to the requirements of various uses or other market requirements. The desired product properties determine to a crucial extent the most suitable pressing-agglomeration process in each case. Depending on the selected agglomeration process, agglomerates which are already in their final product form can be obtained, or larger agglomerates can be obtained which then are subjected as necessary to a comminution process in a known manner.

In principle, any conventional pressing-agglomeration equipment can be used for the process of the invention. It is also possible to agglomerate the primary particles by pressing in the moist state, optionally with the addition of small quantities of liquid, binder, lubricant, other auxiliaries and/or other desired or suitable additives. Preferably, however, the advantages of the invention are most fully realized when pressing-agglomeration processes are used in which exclusively dry primary product material is pressed since in the dry process, the stability of the product (particularly the active oxygen stability) cannot be adversely affected by the presence or the addition of liquid (particularly water), and there is no need for drying after agglomeration. Conversion of the amorphous primary particles with the formation of crystalline proportions does not occur during the pressing-agglomeration stage or else occurs only to a negligible extent. Another advantage of the dry pressing-agglomeration process is that binders, lubricants and/or other auxiliaries can be added, if desired, but are not absolutely essential for carrying out the process. Consequently, undesired property changes in the pressed peroxyborate agglomerates, possibly caused by these additives and auxiliaries, can be avoided. On the other hand, however, it is quite possible to homogeneously mix other desired additives that modify the agglomerates in an advantageous manner, e.g. dyestuffs, with the primary particles to be pressed before pressing-agglomeration.

Suitable pressing-agglomeration devices include, for example, molding presses, stamping presses or roller presses (roller pressure machines) such as smooth rollers, textured rollers or molding rollers (briquetting rollers). These devices can be operated with, or optionally without, devices for forcibly supplying the primary particle material to be pressed. Depending on the pressing-agglomeration equipment used, the primary particles are pressed under pressure into defined shapes, e.g. the shapes of end products such as briquettes or tablets, or into solid, smooth or textured flat sheets also referred to as pressed strips. Briquettes or tablets may already have the desired product shape, but pressed strips, and sometimes also briquettes, are usually subsequently comminuted to granules of the desired size.

In particularly advantageous embodiments of the process of the invention, roller presses are used, with textured rollers or briquetting rollers being preferred. If briquetting rollers are used, the surfaces of the rollers are provided with cavities which determine the geometric shape of the product. Various briquette shapes can be produced in a large number of dimensions, e.g. square or rectangular cushion shapes, square or round pastille shapes, almond shapes, regular prism shapes, truncated prisms or saddles. The textured rollers are fluted or continuously profiled rollers for the production of smooth or profiled flat sheets (pressed strips), ribbons or compacted material. If textured rollers are used, slightly or more strongly profiled rollers can be used, the latter in an open or closed setting. In this way, smooth, slightly or more strongly textured (e.g. fluted or wafer-like) pressed strips, corrugated strips or, if the rollers profiled evenly over the entire width of the roller in the closed position, rods can be obtained.

Insofar as the products obtained by pressing-agglomeration do not already have the desired product shape, such as, for example, pressed strips, corrugated strips or rods, these can be comminuted by known processes to granules having the desired particle size and bulk density. For comminution purposes, compressed cake or strip cutters, for example, are suitable for coarse granulation, or granulating screens are suitable for fine granulation. For example, peroxyborate granules with particle sizes of 0.1 to 10 mm can be obtained in this way.

The primary particles supplied to the pressing-agglomeration stage in the process of the invention are produced by a spray drying process. Both the production of the primary particles in the spray drying process and pressing-agglomeration can be carried out continuously and independently of each other. It is not essential to pass the primary particles to the pressing-agglomeration stage immediately after they have been obtained in the spray drying process. If desired, agglomerative granulation can be carried out first after spray drying. The granules obtained from the primary particles by agglomerative granulation are then fed to the pressing-agglomeration stage. In principle, any agglomerative granulation process of the prior art is suitable for optionally agglomeratively granulating the primary particles. Agglomerative granulation can therefore be carried out in the presence of free water and/or in the presence of water of crystallization, and optionally in the presence of conventional granulating aids. Examples of suitable agglomerative granulation processes include granulation in a fluidized bed granulating apparatus, granulation in a mixer or in a drum, and granulation in a spray dryer with an integrated fluidized bed.

Preferably, however, embodiments of the invention do not include an agglomerative granulation stage. In such a case, it is also not essential to subject the spray-dried material, i.e. the primary particles obtained by spray drying, immediately to pressing-agglomeration. It is quite possible for the spray material to undergo e.g. an intermediate storage or for spray drying and pressing-agglomeration to be carried out in separate plants. A particularly advantageous embodiment of the invention is, however, the fully continuous method of operation. With this fully continuous method of operation, dry primary particles are fed to a pressing-agglomeration apparatus immediately after they have been obtained by spray drying (e.g. in conventional spray drying plants or spraying drying plants with an integrated fluidized bed) and pressed to form briquettes, tablets or compressed strips. The compressed strips, and optionally the briquettes or tablets, are subsequently comminuted to granules of the desired particle size and bulk density. Advantageous granules according to the invention have e.g. particle sizes of approximately 0.1 to 2 mm, bulk densities of 0.4 to 1.2 g/l, very good abrasion resistance, a reduced caking tendency, and an increased rate of dissolution.

The primary particles used in an advantageous embodiment of the process of the invention are, for example, amorphous particles of sodium peroxyborates which are preferably substantially dry and free from water of crystallization, and which can be obtained by any spray drying process known in the art. Aqueous solutions or suspensions, which each contain the desired concentration of at least one suitable starting material for the boron, sodium and active oxygen atoms contained in sodium peroxyborates in the desired ratio to each other, are sprayed, and the sprayed droplets of solution or suspension are dried with a heated gas, usually air, which is passed substantially co-currently with the sprayed droplets. The process conditions suitable for preparing sodium peroxyborates by spray drying can be varied in a known manner. For example, as in the case of conventional spray drying processes (SD), inlet air temperatures of 100°–400° C., preferably 150° to 350° C. and exhaust air temperatures of 55 to 120° C., preferably 60° to 100° C., are used. It is also possible to prepare the primary particles by spray drying in a fluidized bed spray dryer (=spray dryer with an integrated fluidized bed FSD).

According to this embodiment of the process according to the invention, sodium peroxyborate agglomerates or granules having different chemical compositions can be obtained depending on the type and composition of the solutions or suspensions used in the spray drying process to prepare the amorphous primary particles. The sodium peroxyborate agglomerates or granules can, therefore correspond in chemical composition to, e.g. superoxidized sodium perborates, conventional sodium perborate monohydrate, or perborates which deviate from the conventional Na:B molar ratio (=1:1) and have a molar ratio of Na:B $\leq$ 1. The active oxygen contents of these sodium perborates range from 14 to 25% by weight.

One group of the amorphous primary particles used for this embodiment of the process according to the invention is characterized chemically by an Na:B molar ratio in the range from more than 0.67:1 to 1:1 and an active oxygen content of 14 to 25% by weight; primary particles with an active oxygen content of 16 to 23% by weight are preferred. This group of primary particles thus also includes those amorphous primary particles composed of superoxidized sodium peroxyborate which can be prepared, for example, according to the process described in German Published Application No. 35 05 158. Moreover, amorphous primary particles having with the chemical composition of sodium perborate monohydrate also belong to this group, said amorphous primary particles being prepared in a similar way by adjusting the solution to be sprayed to a Na:B:O$_2$ molar ratio of 1:1:1, which corresponds to sodium perborate monohydrate.

Sodium peroxyborate agglomerates or granules with a very high solubility and rate of dissolution are obtained according to this embodiment of the process of the invention if primary particles of sodium peroxyborates having an Na:B molar ratio of 0.33:1 to 0.67:1, which deviates from the conventional Na:B molar ratio (=1:1) and having an active oxygen content of 14 to 25% by weight, preferably 16 to 23% by weight are used for the pressing-agglomeration stage. These sodium peroxyborate primary particles can be prepared in a way similar to the above-mentioned sodium peroxyborate primary particles by drying aqueous solutions or suspensions each containing a desired concentration of at least one suitable starting compound for the boron, sodium and active oxygen atoms contained in the sodium peroxyborate to be prepared in the desired ratio to each other (of course, while satisfying the above-mentioned requirements regarding the Na:B molar ratio and the O$_2$ content). In order to prepare an advantageous embodiment of these primary particles, the starting materials are introduced into the reaction mixture to be spray dried, particularly in proportions such that a molar ratio of sodium to boron in the region of 0.45:1 to 0.65:1 is present in the resulting primary particles.

Any of the conventional sources of boron, sodium and active oxygen used to prepare sodium peroxyborates are suitable as starting compounds for preparing the primary particles for the aforementioned sodium peroxyborate-containing embodiments of the invention. Suitable sources of boron include, for example, boric acid, boron oxide ($B_2O_3$), borax, e.g. borax decahydrate or borax pentahydrate, metaborate, orthoborate, boron minerals etc. Hydrogen peroxide solution (e.g. 30–85% by weight) or sodium peroxide are suitable, for example, as sources of active oxygen. Inorganic sodium compounds such as sodium hydroxide or sodium oxide, which yield an inherently alkaline reaction, can be used as sources of sodium, which optionally may be supplemented. The foregoing enumeration is given only by way of example and is neither definitive nor restrictive.

According to the process of the invention, peroxyborate agglomerates or granules composed of other alkali and/or alkaline earth metal peroxyborates are prepared in a manner similar to the preparation of sodium peroxyborate agglomerates and granules described above.

In advantageous embodiments of the invention, customary stabilizers for percompounds are added to the solutions or suspensions to be sprayed. If necessary, before pressing-agglomeration takes place, other stabilizers can also be added to the amorphous primary particles obtained by spray drying. The stabilizers are used in inherently suitable quantities for stabilizing peroxyborate compounds. Suitable stabilizers include, for example, alkali metal or magnesium silicates, magnesium sulfate, phosphates such as metaphosphate, organic stabilizers such as quinolinic acid, salicylic acid or dipicolinic acid (DPA), chelating agents such as 8-oxyquinoline or ethylenediamine tetraacetic acid (EDTA), phosphonic acid derivatives such as methylene or aminomethylene phosphonic acids or salts thereof, and also small quantities of conventional wetting agents. Stabilizers can be present in customary concentrations of from 0.1 to 10 g/kg in the solutions or suspensions to be sprayed. The stabilizers are preferably introduced directly into the reaction mixtures used to prepare the amorphous primary particles. This can be achieved in a simple manner via the hydrogen peroxide solution used. In particular, the stabilizers are used in the quantities that should also be present later in the peroxyborate agglomerates or granules.

The invention also includes peroxyborate agglomerates having an active oxygen content of at least 14% by weight, preferably in the form of briquettes, tablets or granules, which can be obtained according to the process of the invention. In one advantageous embodiment, the invention includes peroxyborate granules which can be obtained by comminuting briquettes, tablets, but particularly by comminuting pressed strips. Preferred peroxyborate agglomerates, particularly granules of the invention are those composed of alkali metal peroxyborates, most preferably sodium peroxyborates. The sodium peroxyborate granules are characterized in this case by, for example, particle sizes of 0.1 to 2 mm and bulk densities of 0.4 to 1.2 g/l.

In one embodiment of the sodium peroxyborate agglomerates according to the invention, preferably in the form of granular material, the agglomerates are characterized by an Na:B molar ratio in the range from more than 0.67:1 to 1:1 and an active oxygen content of 14 to 25% by weight, preferably 16 to 23% by weight. This embodiment includes, for example, both agglomerates, or preferably granules, having the chemical composition of sodium perborate monohydrate or of superoxidized sodium peroxyborates, and agglomerates or granules having a chemical composition including a sodium content which is reduced by up to one third in comparison to the conventional Na:B molar ratio of 1:1.

In another embodiment, sodium peroxyborate agglomerates according to the invention are present, preferably in the form of granules, which have a very high solubility and rate of dissolution and which are characterized by an Na:B molar ratio of 0.33:1 to 0.67:1 and an active oxygen content of 14 to 25% by weight, preferably 16 to 23% by weight.

Particularly advantageous sodium peroxyborate agglomerates or granules are characterized by molar ratios of sodium to boron in the range from 0.45 to 0.65.

The sodium peroxyborate granules of the invention are characterized by a very high rate of dissolution in water. The rate of dissolution is, for example, more than 80% for preferred sodium peroxyborate granules, and even more than 90% for particularly preferred sodium peroxyborate granules. The rate of dissolution is determined under standard conditions: 3 minutes/15° C.; 2 g/l.

The invention also includes colored peroxyborate agglomerates, preferably in the form of sodium peroxyborate granules, which can be prepared according to the process of the invention by mixing a dyestuff powder homogeneously into the primary particles before the pressure-agglomerating step.

A simple and direct process for preparing peroxyborate agglomerates, preferably in the form of granules, is provided as a result of the invention. According to the process of the invention, a large number of agglomerated product shapes in lump form (e.g. briquettes, tablets) and granules can be produced in a simple manner which are suitable for a large number of different uses in the bleaching, disinfecting, cleaning and detergent fields. The granules that can be prepared according to the process of the invention can be adapted in the best possible way in the desired manner, e.g. in terms of their properties such as particle size or bulk density, and can therefore easily be adapted to suit various requirements. In its preferred embodiments, the process essentially avoids any effect of moisture (e.g. free water or water of crystallization) on the primary particles produced as intermediates in the process according to the invention ("dry process") and yields perborate agglomerates or granules, particularly sodium peroxyborate agglomerates or granules, with improved properties. Nevertheless, the properties of granules produced by the agglomerative granulation process (presence of moisture) from the primary particles obtained by spray drying also can be improved by the process of the invention (i.e. by additional pressing-agglomeration of these agglomerative granules). The peroxyborate agglomerates or granules according to the invention exhibit increased rates of dissolution in aqueous media. In particular embodiments of the peroxyborate agglomerates or granules according to the invention, e.g. especially sodium peroxyborate granules with Na:B molar ratios of 0.33:1 to 0.67:1, also have a high solubility in aqueous media. Moreover, the peroxyborate agglomerates or granules according to the invention have a markedly improved storage stability. This is manifested on the one hand in the good stability of the active oxygen content, whereby active oxygen losses are markedly reduced even under extreme storage conditions. On the other hand, the peroxyborate agglomerates or granules according to the invention exhibit an improved caking behavior, i.e. a markedly reduced caking tendency. Moreover, the products which are obtained according to the preferred embodiments of the invention (i.e. products produced by subjecting the amorphous primary particles obtained by spray drying to pressing-agglomeration without an intermediate agglomerative granulation) are completely amorphous to x-rays. Pressing-agglomeration therefore does not lead to development of crystalline areas in the peroxyborate agglomerates or granules of the invention.

The invention is described in further detail by the following examples which are only illustrative and are not intended to be limiting.

EXAMPLE 1

A spray solution was initially prepared by mixing water, aqueous sodium hydroxide solution (50% by weight), borax and hydrogen peroxide (60% by weight) and stabilized with magnesium sulfate hexahydrate and 1,1-hydroxyethane diphosphonic acid (HEDP; 60% by weight). A spray solution was obtained having a boron content of 5% by weight, an Na:B mole ratio of 0.58:1, an $O_2$:B mole ratio of 1:1, and containing 0.4% by weight $MgSO_4 \cdot 6H_2O$ and 0.03% by weight HEDP.

The resulting spray solution was sprayed in a fluid bed spray drier (=spray drier with integrated fluidized bed) under the following operating conditions:

| Feed quantity | 180 kg/h |
| Drying air | 1670 kg/h |
| Inlet air/spray drier | 270° C. |
| Inlet air/fluid bed | 40° C. |
| Outlet air/spray drier | 86° C. |
| Fluid bed temperature | 80° C. |
| Production | 66 kg/h |

The resulting dry, amorphous spray material (primary particles), free from water of crystallization, was collected and passed to a slightly textured roller press for pressing-agglomeration. The primary particles were pressed at a pressing pressure of 1.6 tons/cm roller length (=approx. 100 bar) to form compressed strips having a thickness of 1 mm and subsequently finely granulated in a known manner using a granulating sieve (mesh size 2 mm/1 mm). The primary particles obtained as an intermediate and the ultimately obtained granules had the following properties:

| Product Analysis | Primary Particles | Granules |
|---|---|---|
| Bulk density | 0.2 g/ml | 0.74 g/ml |
| Particle size | | |
| <150 µm | 3.1% | 9.3% |
| >1000 µm | 6.7% | 8.2% |
| Rate of dissolution (3 minutes/15° C., 2 g/l) | 30% | 91% |
| Active oxygen content | 16.5% by wt. | 16.5% by wt. |

EXAMPLE 2

An orthoborate solution was prepared initially by mixing water, aqueous sodium hydroxide solution (50% by wt.) and borax. Hydrogen peroxide (60% by wt.) was subsequently added to the solution, and the solution was then stabilized with the pentasodium salt of ethylene diamine tetramethylene phosphonic acid (EDTMP). A spray solution was obtained having a boron content of 2.7% by weight, an Na:B mole ratio of 0.98:1, an $O_2$:B mole ratio of 1.18:1, and containing 0.14% by weight, EDTMP. The resulting spray solution was sprayed into a spray dryer under the following conditions:

| Feed quantity | 180 kg/h |
| Drying air | 1670 kg/h |
| Inlet air/spray drier | 280° C. |
| Outlet air/spray drier | 95° C. |
| Production | 66 kg/h |

The resulting dry amorphous spray material (primary particles), free from water of crystallization, was collected and fed to a slightly textured roller press for pressing-agglomeration. The primary particles were pressed at a pressing pressure of 1.7 tons/cm roller length (=approx. 105 bar) to form compressed strips having a thickness of 1.7 mm and subsequently finely granulated in a known manner using a granulating sieve (mesh size 2 mm). The fines with a particle size of <150 µm were returned to the pressing-agglomeration stage. The primary particles obtained as an intermediate and the granules ultimately prepared had the following product properties:

| Product Analysis | Primary Particles | Granules |
|---|---|---|
| Bulk density | 0.34 g/ml | 0.85 g/ml |
| Particle size | | |
| <150 µm | 98% | 1.8% |
| >1000 µm | 0% | 56.2% |
| Rate of dissolution (3 minutes/15° C., 2 g/l) | 90% | 100% |
| Active oxygen content | 18.2% by wt. | 18.2% by wt. |

EXAMPLE 3

An orthoborate solution was initially prepared by mixing water, aqueous sodium hydroxide solution (50% by weight) and borax. Hydrogen peroxide (60% by weight) was subsequently added to the solution, and the mixture was then stabilized with the pentasodium salt of ethylene diamine tetramethylene phosphonic acid (EDTMP). A spray solution was obtained having a boron content of 2.5% by weight, an Na:B mole ratio of 0.98:1, an $O_2$:B mole ratio of 1.3:1, and containing 0.14% by weight EDTMP. The resulting spray solution was sprayed in a spray drier under the following operating conditions:

| Inlet air/spray drier: | 280° C. |
| Outlet air/spray drier: | 95° C. |

The resulting dry amorphous spray material (primary particles), free from water of crystallization, was collected and fed to a slightly textured roller press for pressing-agglomeration. The primary particles were pressed at a pressing pressure of 1.7 tons/cm roller length (=approx. 105 bar) to form compressed strips having a thickness of 1.7 mm and subsequently finely granulated in a known manner using a granulating sieve (mesh size 2 mm). The fines with a particle size of <150 µm were returned to the pressing-agglomeration stage. The primary particles obtained as an intermediate and the granules ultimately produced had the following properties:

| Product Analysis | Primary Particles | Granules |
|---|---|---|
| Bulk density | 0.3 g/ml | 0.84 g/ml |
| Particle size | | |
| <150 μm | 100% | 2% |
| >1000 μm | 0% | 51.9% |
| Rate of dissolution (3 minutes/15° C., 2 g/l) | 55% | 80% |
| Active oxygen content | 20.8% by wt. | 20.8% by wt. |

EXAMPLE 4

A spray solution was initially prepared by mixing water, aqueous sodium hydroxide solution (50% by weight), borax ($H_3BO_3$), and hydrogen peroxide (60% by weight) and stabilized with the pentasodium salt of ethylene diamine tetramethylene phosphonic acid (EDTMP). A spray solution was obtained having a boron content of 4% by weight, an Na:B mole ratio of 0.53:1, an $O_2$:B mole ratio of 0.9:1, and containing 0.1% by weight EDTMP. The resulting spray solution was sprayed in a fluid bed spray granulator under the following operating conditions:

| Inlet air/fluid bed: | 150° C. |
|---|---|
| Outlet air/fluid bed: | 60° C. |
| Fluid bed temperature: | 65-70° C. |

The resulting dry amorphous spray material (primary particles), free from water of crystallization, was collected and fed to a slightly textured roller press for pressing-agglomeration. The primary particles were pressed at a pressing pressure of 1.7 tons/cm roller length (=approx. 105 bar) to form compressed strips having a thickness of 1.7 mm and subsequently finely granulated in a known manner using a granulating sieve (mesh size 2 mm). The primary particles obtained as an intermediate and the granules ultimately produced had the following properties:

| Product Analysis | Primary Particles | Granules |
|---|---|---|
| Bulk density | 0.61 g/ml | 0.76 g/ml |
| Particle size | | |
| <150 μm | 0.2% | 7.9% |
| >1000 μm | 78.5% | 41.3% |
| Rate of dissolution (3 minutes/15° C., 2 g/l) | 20% | 92% |
| Active oxygen content | 15.4% by wt. | 15.4% by wt. |

EXAMPLE 5

In order to investigate the chemical stability (Avox stability), the dry and wet stabilities of the primary particles obtained as intermediates in Example 1 through Example 4 and the granules prepared therefrom were analyzed.

In order to determine the dry stability, 1 g of each of the samples to be analyzed was heated in an open test tube for 1 hour at 100° C. in an oil bath, and the active oxygen loss caused by decomposition was subsequently determined.

In order to determine the wet stability, 1.67 ml water were added to 1 g of each of the samples to be analyzed in a test tube, and the mixture was heated for 20 minutes at 90° C. in a water bath. The active oxygen loss caused by decomposition was subsequently determined.

As a comparison, the stability of conventional sodium perborate monohydrate (prepared by fluid bed drying of sodium perborate tetrahydrate obtained by crystallization) was determined under similar conditions.

The active oxygen content before and after storage was determined by known titrimetric methods, and the following results were obtained:

| | Avox loss in % | |
|---|---|---|
| Example | Dry stability 100° C./1 h. | Wet stability 90° C./20 min. |
| 1 | 10 | 7.3 |
| 2 | 2.4 | 3.9 |
| 3 | 3.1 | 5 |
| 4 | 9.1 | 4.4 |
| Comparison (PBS-1) | 8 | 9 |

EXAMPLE 6

For further analysis of their chemical stability (Avox stability), the primary particles obtained as intermediates in Example 1 and Example 3 and the granules prepared therefrom were each introduced into a standardized zeolite-containing base washing powder in customary quantities for washing agent compositions so that the initial total active oxygen content was between 2.00 and 2,20% by weight of the total mixture. The resulting mixtures were introduced into wax coated boxes and subsequently stored at 37° C. and 70% relative humidity. After a storage period of four weeks, the active oxygen loss caused by decomposition was determined (the active oxygen content before and after storage was determined by known titrimetric methods). For comparison, the stability of conventional sodium perborate monohydrate (prepared by fluid bed drying of sodium perborate tetrahydrate obtained by crystallization) was determined under similar conditions. The results obtained are summarized below:

| | Avox loss in % | |
|---|---|---|
| Example | Primary Particles | Granules |
| 1 | 53 | 32 |
| 3 | not determined | 28 |
| Comparison with conventional PBS-1 | — | 39 |

The foregoing description and examples have been set forth merely to illustrate the invention and are not intended to be limiting. Since modifications of the described embodiments incorporating the spirit and substance of the invention may occur to persons skilled in the art, the scope of the invention should be construed to include all variations falling within the ambit of the appended claims and equivalents thereof.

What is claimed is:

1. A process for preparing a peroxyborate agglomerate comprising the steps of:
compacting amorphous, spray dried primary peroxyborate particles by dry pressing in a roller press to agglomerates in the form of smooth, fluted or textured pressed strips, said particles having an active oxygen content of at least 14% by weight and being selected from the group consisting of peroxyborate particles having a Na:B ratio of less than 1 and peroxyborate particles having an active oxygen content greater than 18% by weight; and subsequently comminuting said strips into smaller agglomerates in the form of granular amorphous material having a desired particle size and bulk density.

2. A process for preparing a peroxyborate agglomerate according to claim 1, further comprising subjecting the spray dried primary particles to agglomerative granulation prior to said pressing-agglomeration compacting step.

3. A process according to claim 1, wherein said primary particles are compacted by pressing at a temperature in the range from 20° to 50° C.

4. A process according to claim 1, wherein said pressed strips are produced by pressing in a roller press at a pressure of at least 0.2 tons per cm roller length.

5. A process according to claim 4, wherein said pressed strips are produced by pressing in a roller press at a pressure of at least 0.8 tons per cm roller length.

6. A process according to claim 1, further comprising homogeneously mixing dyestuff powder with said primary particles prior to said compacting step to produce a colored agglomerate.

7. A process according to claim 1 wherein said granular amorphous material has particle sizes in the range from about 0.1 to about 2 mm.

8. A peroxyborate agglomerate having an active oxygen content of at least 14% by weight produced by the process of claim 1, wherein said agglomerate is in the form of granular amorphous material, and the peroxyborate of the agglomerate is selected from the group consisting of peroxyborate having a Na:B ratio of less than 1 and peroxyborate having an active oxygen content greater than 18% by weight.

9. A peroxyborate agglomerate according to claim 8, wherein said agglomerate is in the form of granular material which additionally comprises a dyestuff for producing a colored agglomerate.

10. An agglomerate according to claim 8, wherein said granular amorphous material has particle sizes in the range from about 0.1 to about 2 mm.

11. A peroxyborate agglomerate having an active oxygen content of at least 14% by weight produced by the process comprising the steps of compacting amorphous, spray dried primary peroxyborate particles by dry pressing in a roller press to agglomerates in the form of smooth, fluted or textured pressed strips, and subsequently comminuting said strips into smaller agglomerates in the form of granular amorphous material having a desired particle size and bulk density; wherein said agglomerate is in the form of granular amorphous material and said peroxyborate is sodium peroxyborate having an Na:B mole ratio of 0.33:1 to 0.67:1 and an active oxygen content of 14 to 25% by weight.

12. A peroxyborate agglomerate according to claim 11, wherein said agglomerate is in the form of granular material having an active oxygen content of 16 to 23% by weight.

13. A peroxyborate agglomerate having an active oxygen content of at least 14% by weight produced by the process comprising the steps of compacting amorphous, spray dried primary peroxyborate particles by dry pressing in a roller press to agglomerates in the form of smooth, fluted or textured pressed strips, said particles having an active oxygen content of at least 14% by weight; and subsequently comminuting said strips into smaller agglomerates in the form of granular amorphous material having a desired particle size and bulk density; wherein said peroxyborate is sodium peroxyborate and said agglomerate is in the form of granular amorphous material having an Na:B molar ratio in the range from 0.45:1 to 0.65:1.

* * * * *